US011757306B2

(12) United States Patent
Oster et al.

(10) Patent No.: US 11,757,306 B2
(45) Date of Patent: Sep. 12, 2023

(54) WIRELESS POWER RECEIVER TECHNOLOGY

(71) Applicant: Ossia Inc., Redmond, WA (US)

(72) Inventors: Adam W. Oster, Snoqualmie, WA (US); Hatem Ibrahim Munir Zeine, Woodinville, WA (US)

(73) Assignee: Ossia Inc., Redmond, WA (US)

( * ) Notice: Subject to any disclaimer, the term of this patent is extended or adjusted under 35 U.S.C. 154(b) by 0 days.

(21) Appl. No.: 17/537,464

(22) Filed: Nov. 29, 2021

(65) Prior Publication Data

US 2022/0085661 A1 Mar. 17, 2022

Related U.S. Application Data

(63) Continuation of application No. 16/682,458, filed on Nov. 13, 2019, now Pat. No. 11,211,827.

(60) Provisional application No. 62/769,504, filed on Nov. 19, 2018.

(51) Int. Cl.
*H02J 50/00* (2016.01)
*H02J 50/20* (2016.01)
*H02J 50/70* (2016.01)
*H02J 50/90* (2016.01)

(52) U.S. Cl.
CPC ............ *H02J 50/005* (2020.01); *H02J 50/20* (2016.02); *H02J 50/70* (2016.02); *H02J 50/90* (2016.02)

(58) Field of Classification Search
CPC .. H02J 50/20; H02J 50/50; H02J 50/70; H02J 50/90; H02J 7/025; H02J 50/005
USPC ......................................................... 307/104
See application file for complete search history.

(56) References Cited

U.S. PATENT DOCUMENTS

2010/0210233 A1* 8/2010 Cook ...................... H02J 50/12
455/270

OTHER PUBLICATIONS

Office Action dated Mar. 16, 2021 for U.S. Appl. No. 16/682,458, 29 pages.

* cited by examiner

*Primary Examiner* — Hal Kaplan
(74) *Attorney, Agent, or Firm* — Amin, Turocy & Watson, LLP

(57) ABSTRACT

Wireless power receivers are described, which are used in conjunction with a wireless power transmission system. For instance, a wireless power receiver is provided comprising an antenna configured to receive wireless power signals from a wireless power signal transmitter. The antenna can be coupled to wireless power circuitry that delivers power based on the wireless power signals received by the antenna. Further, a module is provided that contains the wireless power receiver and couples to a device powered by the wireless power circuitry. Further, the module is configured to couple to the device in a fixed position that affixes an orientation of the antenna relative to the device.

20 Claims, 17 Drawing Sheets

WIRELESS POWER RECEIVER TECHNOLOGY

RELATED APPLICATIONS

The subject patent application is a continuation of U.S. patent application Ser. No. 16/682,458 (now U.S. Pat. No. 11,211,827), filed Nov. 13, 2019, and entitled "WIRELESS POWER RECEIVER TECHNOLOGY," each of which applications claim priority to U.S. Provisional Patent Application No. 62/769,504, filed Nov. 19, 2018, and entitled "WIRELESS POWER RECEIVER TECHNOLOGY," the entireties of which priority applications are hereby incorporated by reference herein.

TECHNICAL FIELD

The subject disclosure generally relates to embodiments corresponding to wireless power receivers used in conjunction with a wireless power transmission system.

BACKGROUND

Directed antenna systems can transmit wireless power over radio frequency (RF) signals to various devices coupled to a wireless power receiver, which provides for wireless power over relatively long distances compared to the short electromagnetic field distances needed for inductive charging-type systems. In general, a wireless power receiver comprises an antenna (one or more antenna elements) and circuitry that converts RF signals received via the antenna into power.

As long as the wireless power receiver is able to receive the RF signals from a wireless power transmitter, the wireless power receiver supplies power. Note that the wireless power receiver can be coupled to a battery as well, so that an interruption in receiving the RF signals (e.g., a user temporarily moves the device out of range of the transmitter) does not interrupt delivery of power. Thus, a wireless power receiver can provide significant advantages over a conventional battery that eventually dies and needs to be replaced, or if rechargeable, needs to be recharged by inductive charging or by making physical electrical contact with a recharging component.

One of the ways a wireless power receiver can be realized is by incorporating the wireless power receiver into a conventional (e.g., AA size) battery form factor. While convenient and simple for users to understand, this can have some drawbacks.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional wireless power receiver technologies have had some drawbacks with respect to receiving transmitted RF signals. For example, a wireless receiver can have its antenna oriented in a less-than desirable ideal orientation with respect to receiving signals. This is particularly true of a wireless power receiver incorporated into a cylindrical housing to fit a conventional battery receptacle, because the user generally does not care about how the cylinder is rotated along its axis when inserted into the receptacle.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

Figure 1:
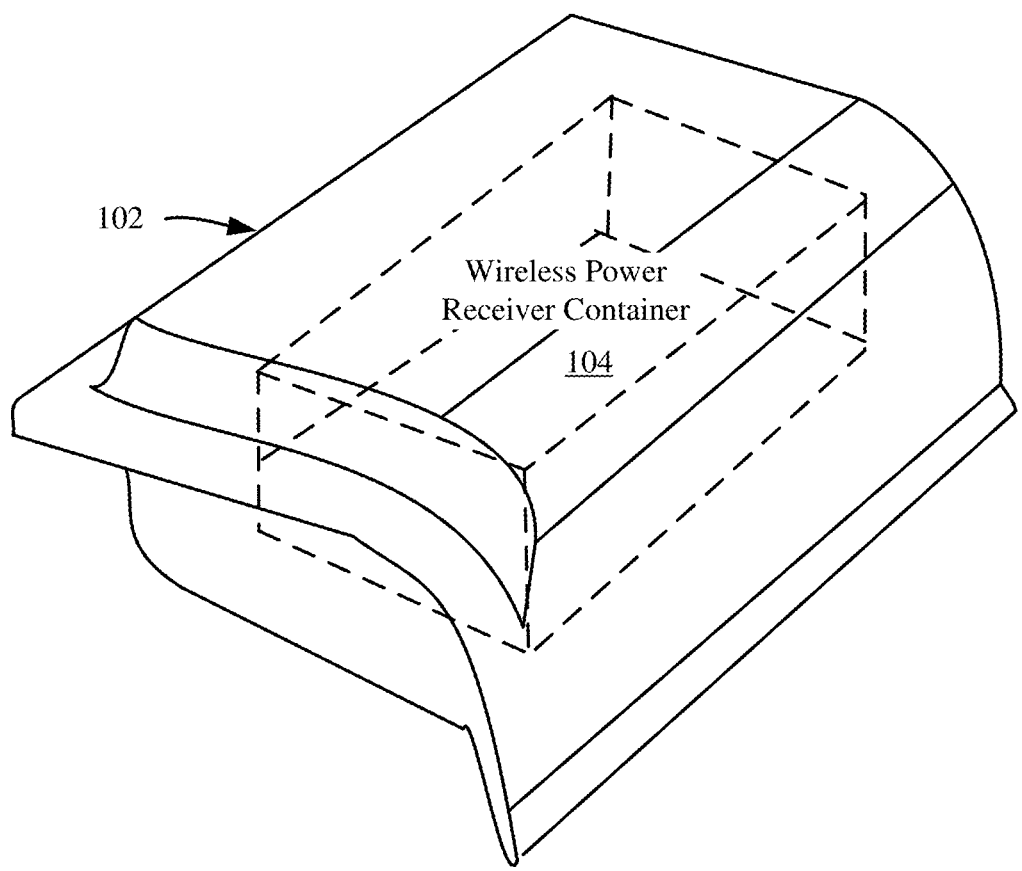
FIGS. 1 and 2 are perspective views illustrating an example power pack (module) and housing, such as for a game controller, which contains a wireless power receiver, in accordance with various example embodiments of the subject matter disclosed herein.
Figure 2:
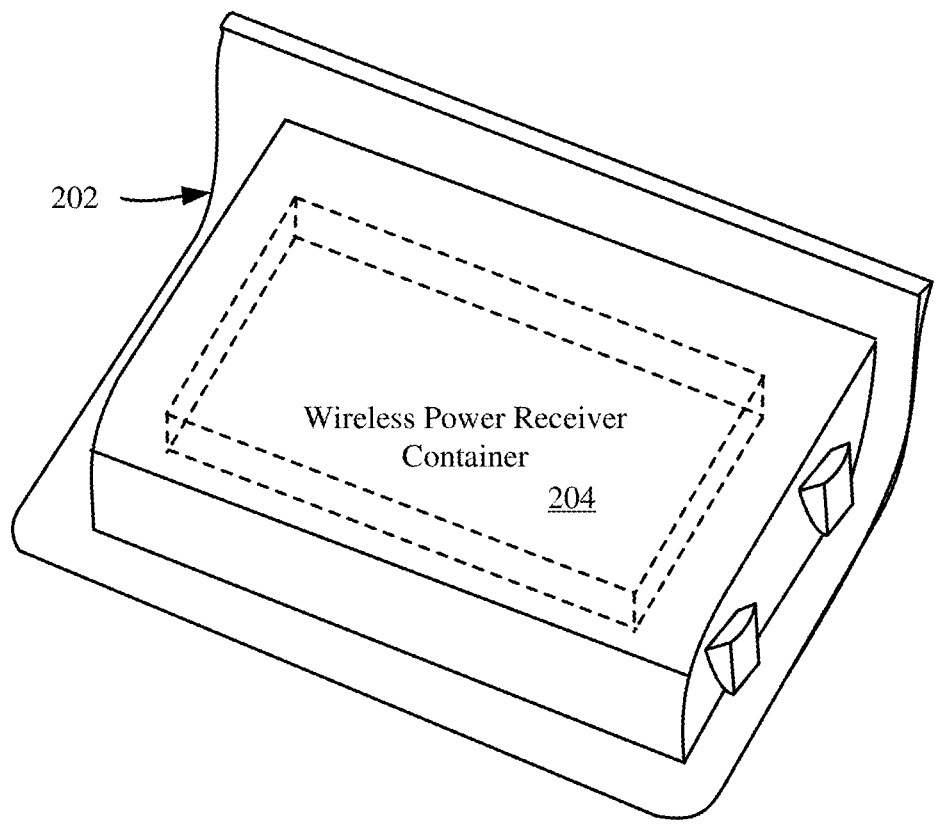

FIG. 1 is an example of a power pack/module 102 that contains a wireless power receiver container 104. In one or more implementations, the module is designed for a device such as a game controller, television remote control, power tool, cellphone, etc., and comprises a housing that is not intended to be opened, at least not regularly, such as by sealing, gluing, bolting, screwing, molding and/or other generally permanent or semi-permanent enclosing/encasing techniques. FIG. 2 depicts a similar example power pack/module 202 that contains a wireless power receiver 204.

As described herein, the wireless power receiver container 104, 204 is intended to be fixed relative to the power pack/module 102, 202. As a result, once constructed, the orientation of the wireless power receiver's antenna (not explicitly shown) is fixed relative to the module 102, 202. This means, for example, that the wireless power receiver antenna(s) can be positioned near a particular surface of the module's enclosing device, to facilitate improved RF reception of the wireless power signals. In the event that the wireless power receiver is contained in one or more symmetrical containers such as cylindrical (e.g., AAA, AA, C or D battery-shaped) housings, then an aspect of the manufacturing process is to ensure that such symmetrical containers are properly oriented and fixed in that oriented position once enclosed in the module 102, 202.

Turning to another aspect, when dealing with a power-pack/module that is designed for a particular device or set of devices, there is not necessarily a limitation that the wireless power receiver be in any particular shape; significantly, the wireless power receiver need not be in a conventional battery-shaped container. Indeed, many device manufacturers specify non-standard sized and/or shaped conventional battery packs; for example, one manufacturer's battery-powered drill battery typically does not fit another manufacturer's drill or recharging base. Note that even a module that contains a pair of batteries in series is typically able to be oriented in only one way relative to the device into which the module is inserted.

Figure 3:
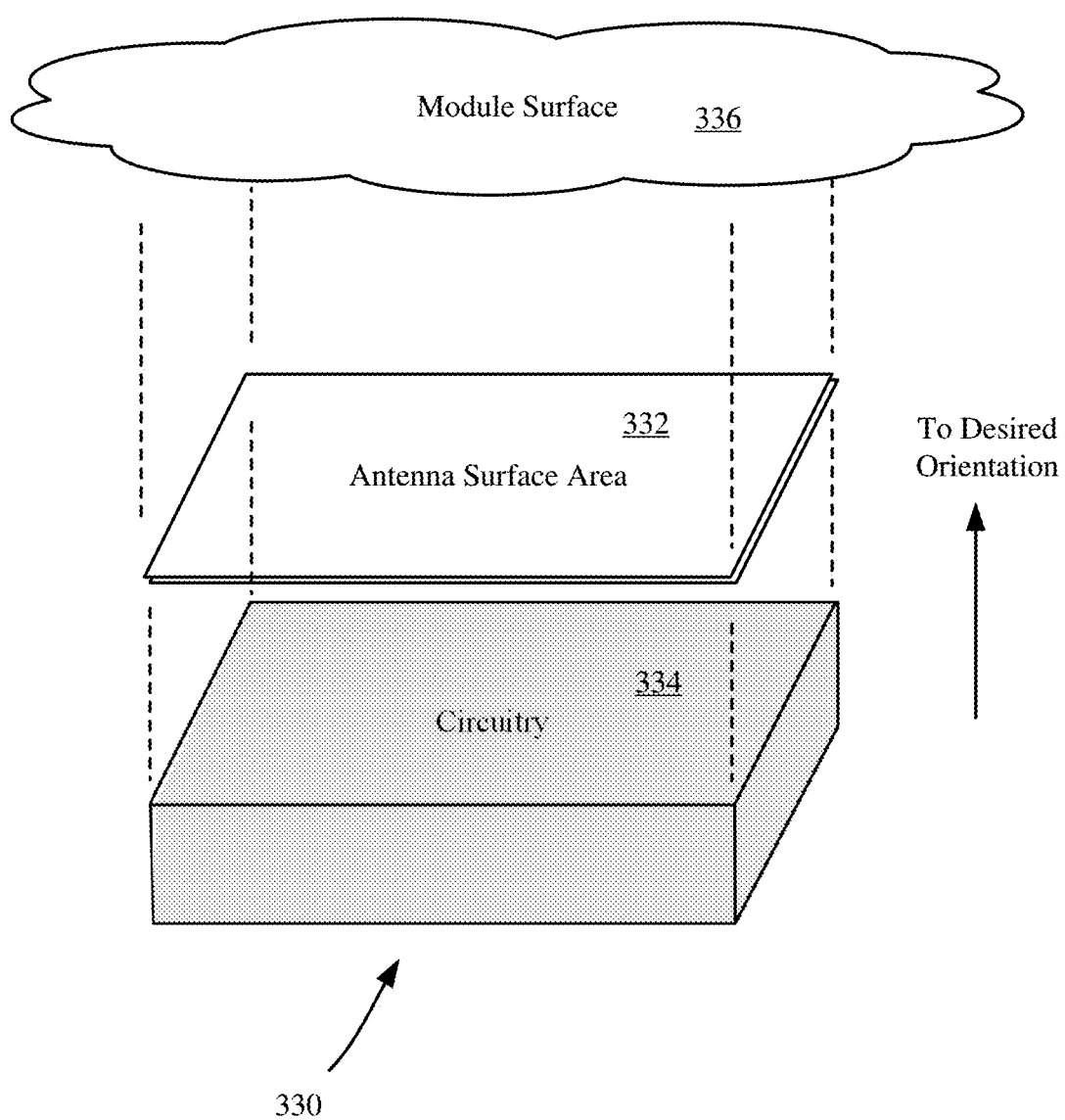
FIG. 3 illustrates an example wireless power receiver antenna configured with its surface area oriented in a desired orientation with respect to RF reception, such as above circuitry, in accordance with various example embodiments of the subject matter disclosed herein.

As a result, as shown in the example subsystem 330 of FIG. 3, the wireless power receiver antenna can be enlarged (to the extent available within an enclosing module or the like) to a desired surface area 332 and orientation, e.g., relative to the wireless power receiver and/or device circuitry 334, and relative to a desired module surface 336. Note that once the module is inserted into the device, the module surface 336 is generally fixed relative to the device's internal components as well.

Figure 4:
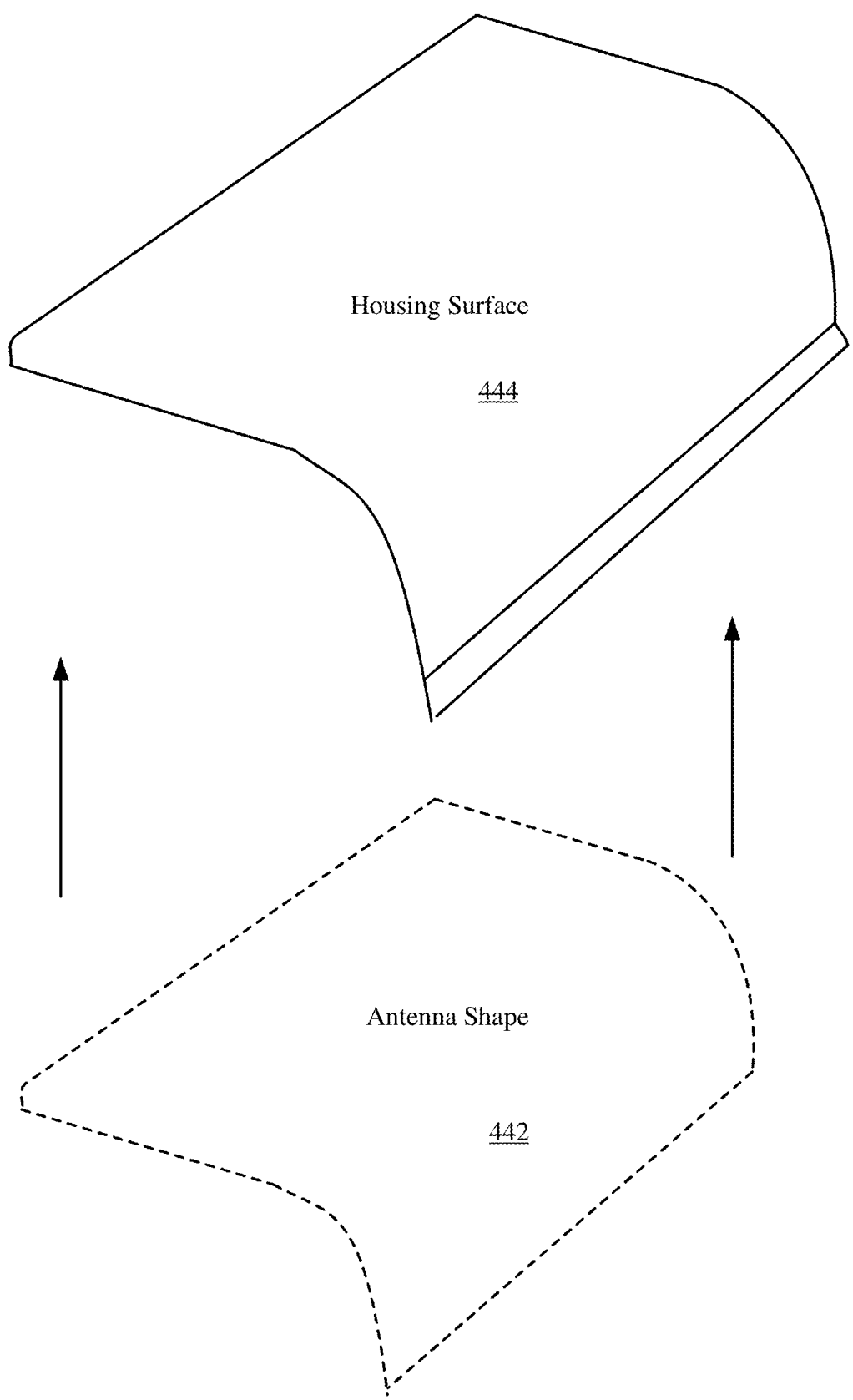
FIG. 4 illustrates an example wireless power receiver antenna configured with its surface area in the general shape of a housing portion in which the antenna is contained, in accordance with various example embodiments of the subject matter disclosed herein.

FIG. 4 shows another example of expanding a wireless power receiver antenna's surface area to improve RF reception when a non-standard sized and shaped power pack/module housing contains the wireless power receiver. In FIG. 4, the antenna 442 is shaped to match a housing surface 444.

Moreover, it should be noted that the illustrated antenna 442 need not be part of a power pack/module that powers a device and/or need not be part of the wireless power receiver. Instead, the device or the power pack/module can house a complimentary antenna that complements the wireless power receiver's antenna(s), thus increasing the overall system gain and the power transferred to the wireless power receiver. In some applications, it is feasible to hinge the antenna/housing surface to a desired position, e.g., the surface opens up to improve RF reception when inserted into the device and recloses to protect the internal components when removed from the device.

Still further, the module and/or device housing can comprise material properties (e.g., dielectric constant) and geometry to create a lensing effect that increases the power focused at the wireless power receiver. Such a housing can be considered a radome that is specifically tuned and designed to increase the power transfer to the wireless power receiver's antenna(s).

Figure 5A:
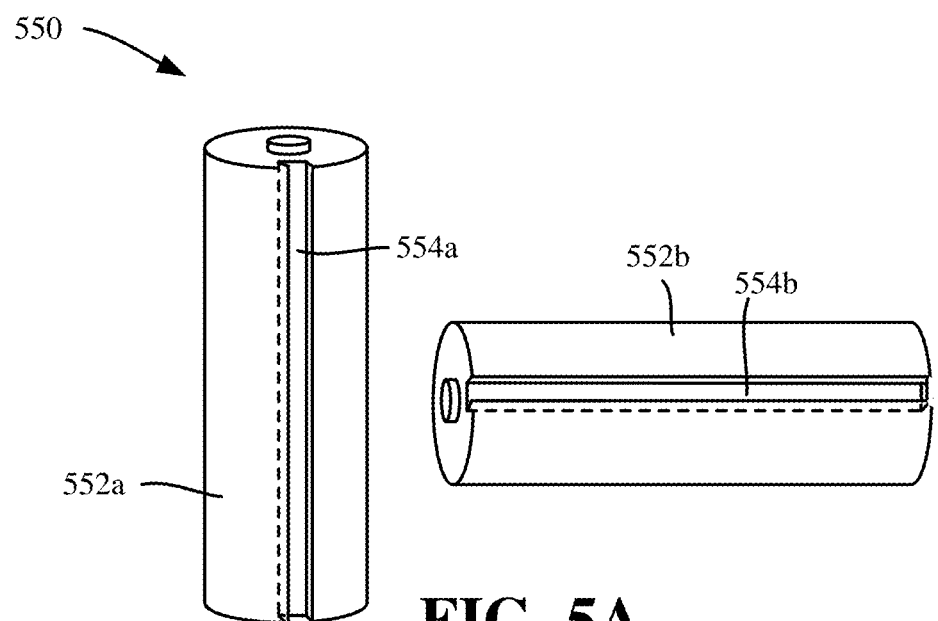
FIGS. 5A and 5B illustrate an example pair of generally battery-shaped wireless power receiver containers (FIG. 5A) and a corresponding receptacle housing (FIG. 5B) for inserting the wireless power receiver containers, in which the wireless power receiver containers include a notch or groove and the housing's receptacles include protrusions for guiding insertion of the wireless power receiver containers in a fixed orientation relative to the housing, in accordance with various example embodiments of the subject matter disclosed herein.

Turning to another aspect, as users are familiar with conventional cylindrical shaped batteries, one or more implementations can leverage such familiarity while also forcing a particular antenna orientation of a wireless receiver contained in a battery-link housing (556). As one example, FIG. 5A shows a pair of wireless receiver containers 550 that are substantially shaped like conventional batteries. However, the illustrated containers contain grooves/notches, that is, container 552a comprises a lengthwise groove 554a, and the container 552b comprises a lengthwise groove 554b. The wireless power antennas (not explicitly shown) within the containers 550 are consistently oriented relative to the grooves when manufactured.

Figure 5B:
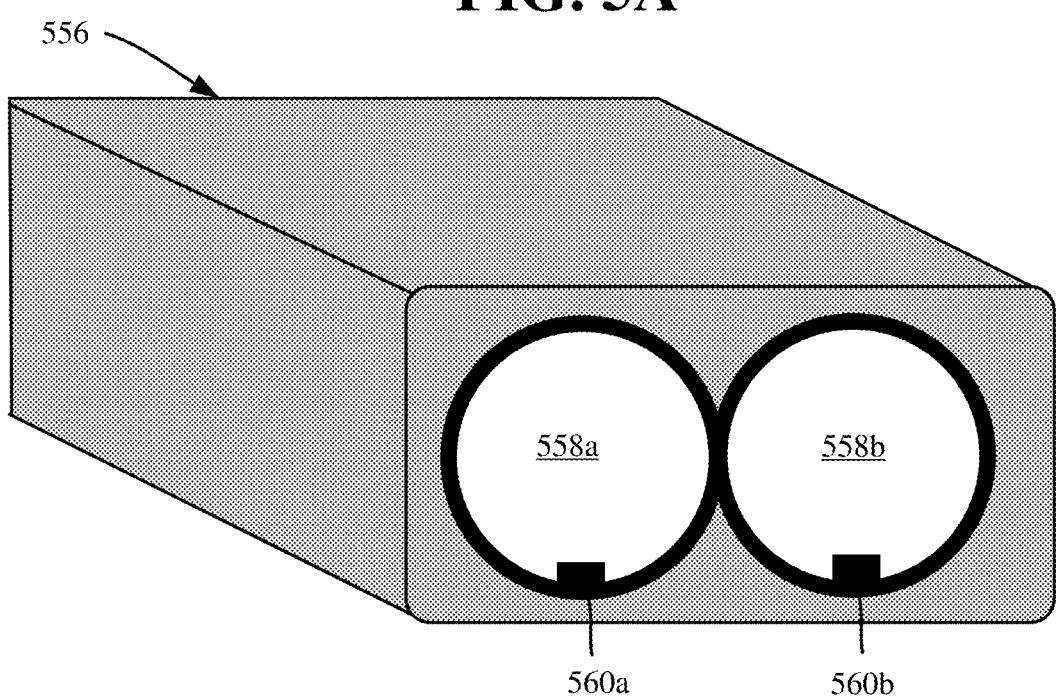

Such wireless receiver containers 552*a* and 552*b* can be used in conjunction with the receptacles 558*a* and 558*b* of FIG. 5B. As can be seen, the receptacles 558*a* and 558*b* have protrusions 560*a* and 560*b*, respectively that prevent insertion of the containers 552*a* and 552*b* unless properly aligned, which thereby properly orients the antennas. The protrusions can be of any length, including as simple tabs, as long as sufficiently strong enough to withstand the reasonable force of a misaligned insertion attempt. The grooves need not be linear, and, for example can be arranged to force a container to be rotationally inserted, in a screw-like manner. This can (intentionally) make removal difficult, as can other means such as mechanical locking mechanisms, indentations in the groove and counterpart angled tabs on the receptacle that allow insertion (only at a correct polarity) but prevent removal, and so forth.

It should be noted that the protrusion near the insertion point of the receptacle helps visually guide alignment. However, the protrusion can be located anywhere within the receptacle, as long as the groove extends to the ends of the cylinders. Note that two grooves, one groove at each end of the cylinder can be used as long as the protrusion is positioned within the receptacle to allow full insertion; indeed, grooves of different lengths in conjunction with differently-positioned protrusions can force insertion to be at the correct polarity.

Figure 6A:
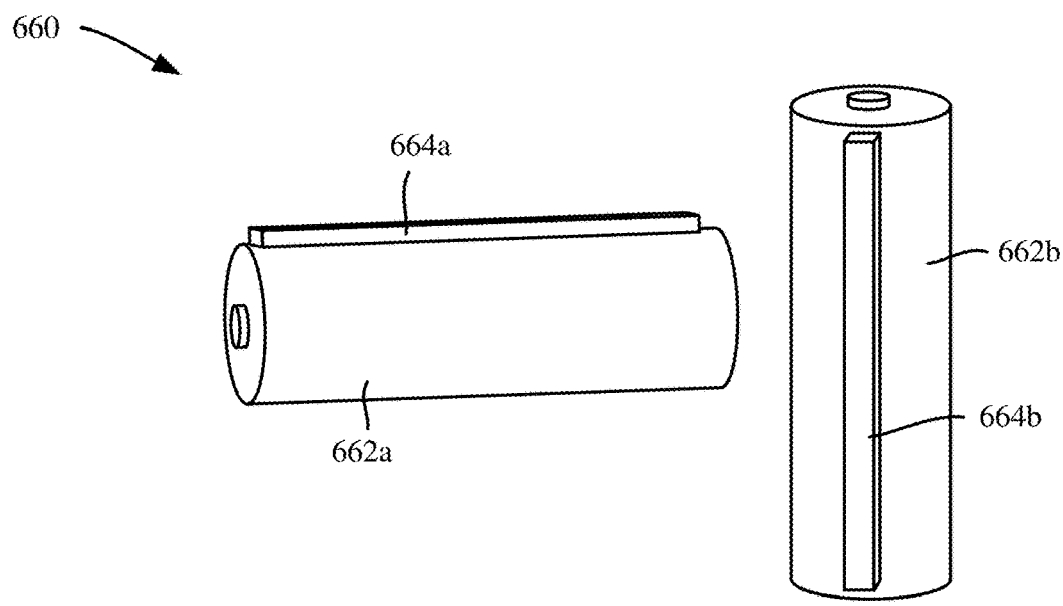
FIGS. 6A and 6B illustrate an example pair of generally battery-shaped wireless power receiver containers (FIG. 6A) and a corresponding receptacle housing (FIG. 6B) for inserting the wireless power receiver containers, in which the wireless power receiver containers include a protrusion such as a ridge and the housing's receptacles include corresponding slots/notches/grooves for guiding insertion of the wireless power receiver containers in a fixed orientation relative to the housing, in accordance with various example embodiments of the subject matter disclosed herein.
Figure 6B:
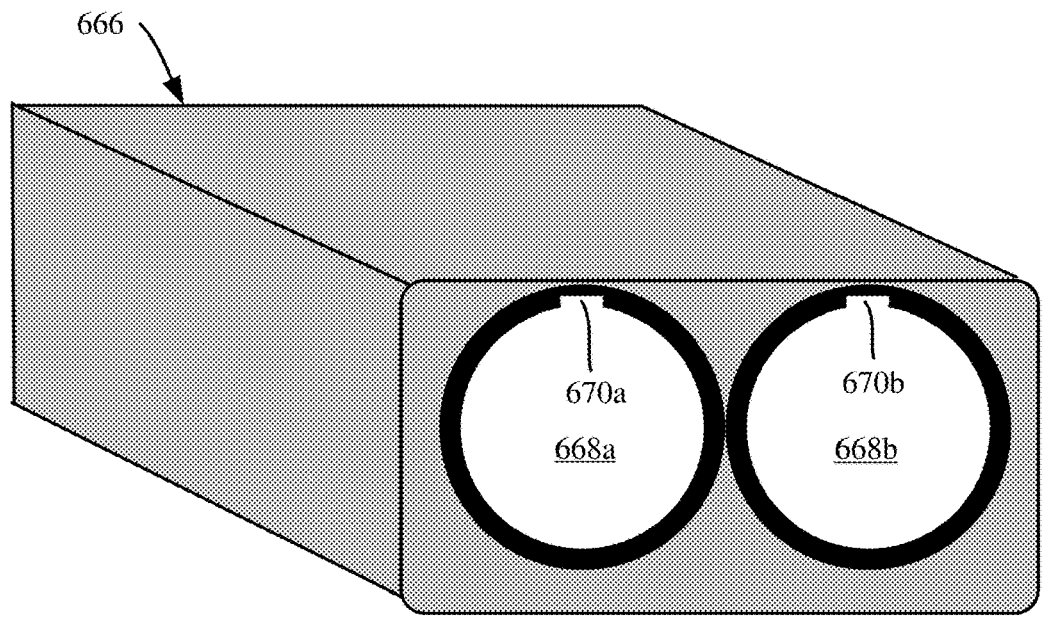

FIGS. 6A and 6B are somewhat similar wireless receiver container examples to those of FIGS. 5A and 5B, except that the protrusions 664*a* and 664*b* are on the cylinders 662*a* and 662*b* of a pair of wireless receiver containers 660, respectively, while the grooves/notches 670*a* and 670*b* are on the receptacles 668*a* and 668*b* of battery-link housing 666, respectively. Again, aligned insertion, and thus corresponding antenna orientation, is ensured by the exemplified mechanical scheme. Note that part of the wireless receiver antenna can be designed to extend into a protrusion 664.

Figure 7:
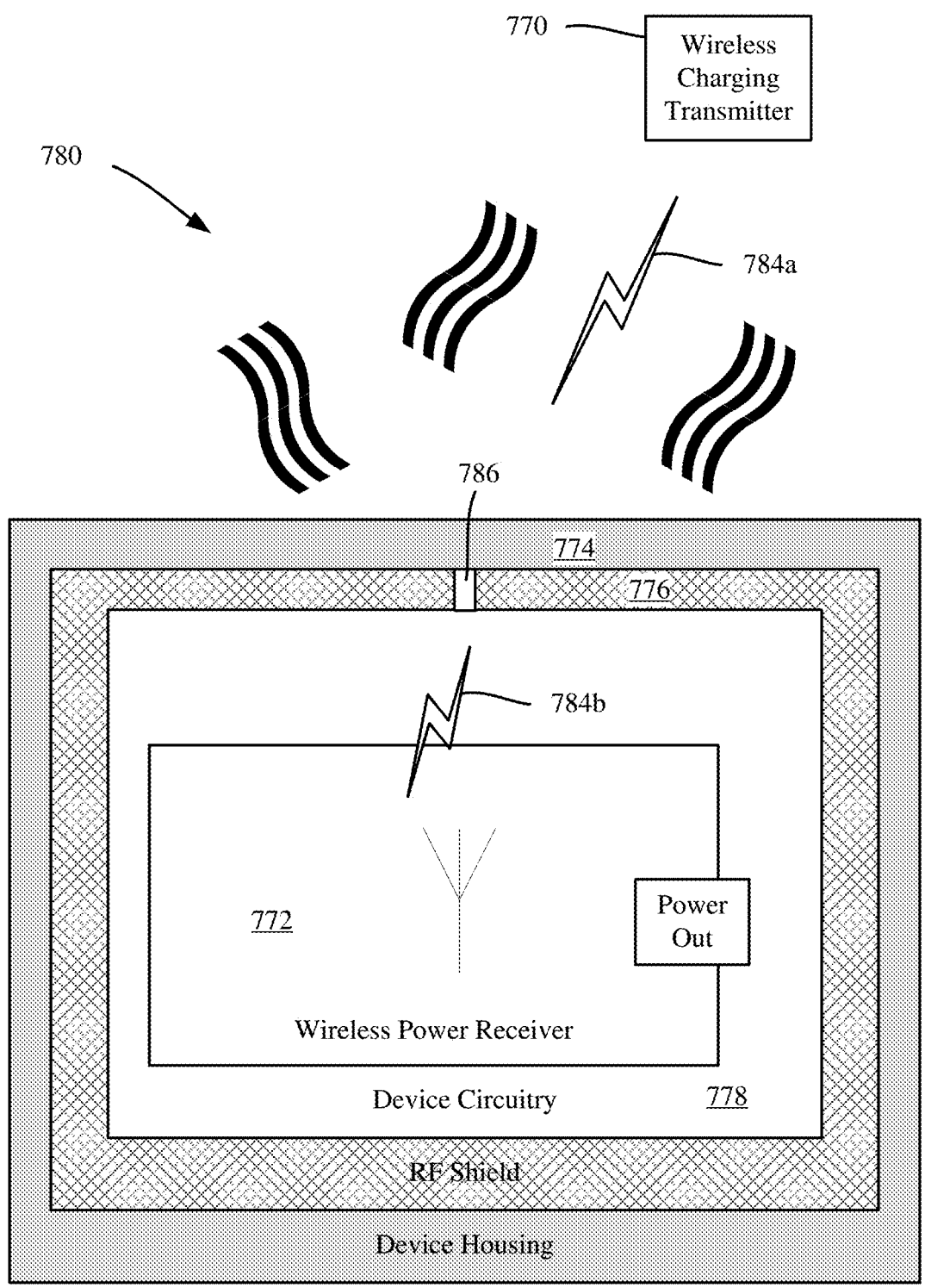
FIG. 7 illustrates a generally RF-shielded device that contains a wireless power receiver, in which the shield allows reception of wireless power signals within a certain frequency band, in accordance with various example embodiments of the subject matter disclosed herein.

Turning to another aspect, FIG. 7 shows a device housing 774 that has an RF shield 776. To allow wireless power from a suitable charging transmitter 770, the shield is configured with an appropriate conduit 786 or set of conduits, that only pass a specific wireless power frequency band 784 (or bands), for example that are needed for charging among many possible RF frequencies 780. Thus, for example, if the device/device circuitry 778 needs to be shielded against receiving or emitting certain frequencies, the wireless power receiver 772 can still be charged.

Note that the device housing 774 can hermetically seal the device, as well as conform to other environmentally-related requirements, e.g., be airtight, be waterproof to a certain pressure, resist corrosion and so forth. The wireless power antenna can be contained and sealed within the housing 774.

Figure 8:
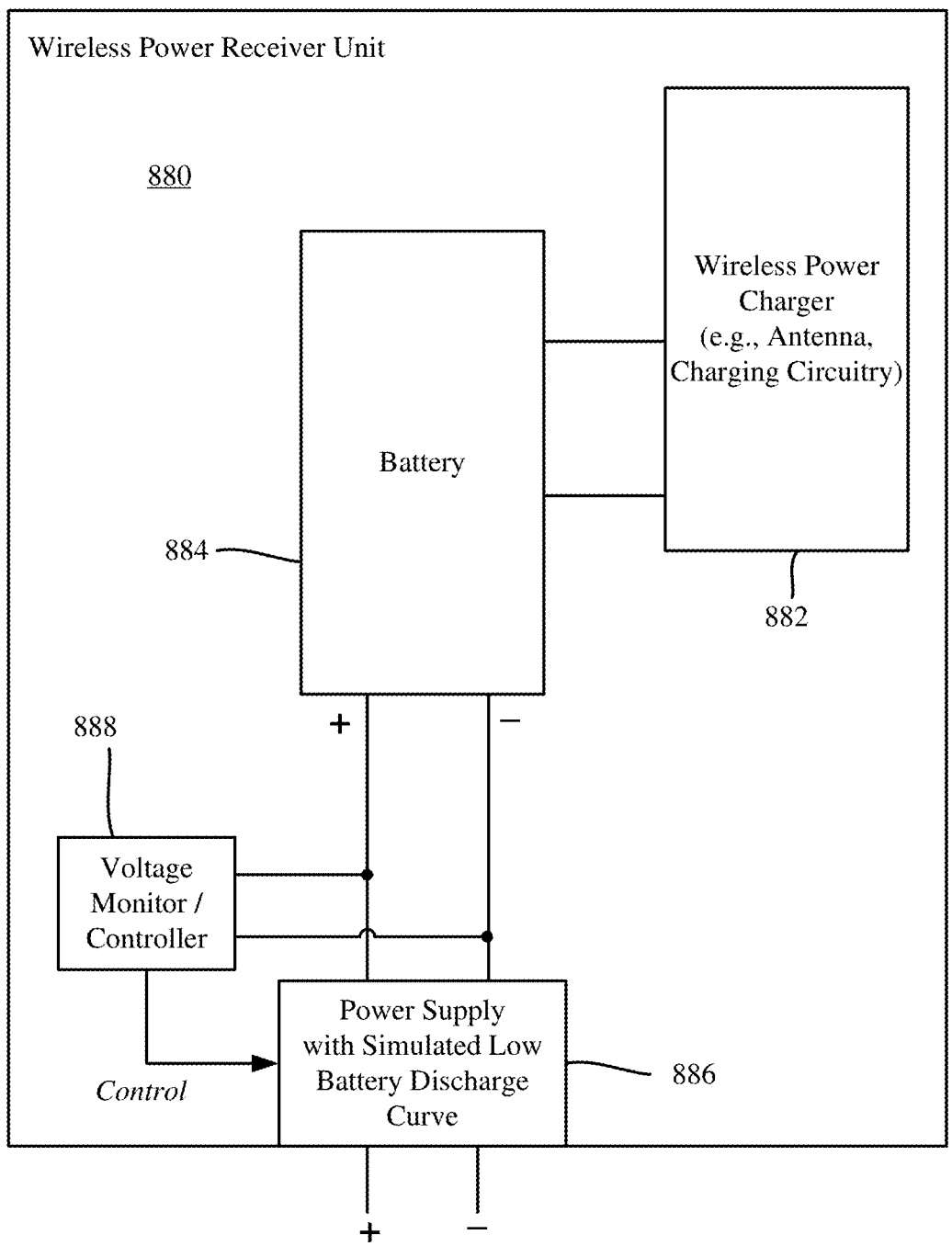
FIG. 8 illustrates a wireless power receiver unit that simulates a low-battery condition when a wireless power battery is providing power output at a reduced level due to not being wireless recharged, in accordance with various example embodiments of the subject matter disclosed herein.

FIG. 8 shows another aspect of the technology. In FIG. 8, a wireless power receiver unit 880 contains the wireless power charger components 882 (e.g., antenna, charging circuitry) and a rechargeable battery 884 such as a lithium ion type battery.

In a typical configuration, the battery 884 provides power to a voltage regulator/power supply; e.g., a battery greater than 3 volts provides power to a voltage regulator that outputs a steady 1.5 volts. A problem arises with this typical configuration because if the battery 884 is not being wireless recharged by the charger 882, e.g., the receiver unit 880 is out of range of the transmitter or the transmitter is turned off, the battery will eventually go below the minimum voltage needed by the voltage regulator or the like. Thus, instead of a gradual decline in voltage, the power output of the receiver unit 880 goes from 1.5 volts to zero volts in this example almost instantly (and may jump back and forth between 1.5 volts and zero volts for a time if the battery hovering at the minimum voltage needed by the regulator).

Many devices have indicators (e.g., LEDs, audible beeps and so forth) that inform a user when a battery is getting low and needs to be recharged/replaced. This does not work in the above scenario because of the basically instantaneous drop off in voltage; there is no time for a warning.

To avoid this problem, the wireless power receiver unit 880 of FIG. 8 includes a voltage monitor/controller that monitors the voltage of the battery 884. When, due to a lack of wireless recharging, the battery 884 begins dropping in its voltage output, the voltage monitor/controller 888 controls the voltage output of the power supply 886 (e.g., a variable voltage regulator) to output voltage at time-decreasing levels to simulate a low battery discharge curve. This triggers existing warning circuitry in devices, which users will recognize as the need to recharge the battery in some way, or change the power pack, etc.

Note that the wireless power receiver unit can provide for non-wireless recharging of the battery 884. By way of example, if a user has taken his game controller to a friend's house who does not have a wireless transmitter, the battery can be recharged by wired means (e.g., USB), for example. Depending on the type of device, conventional batteries may be substituted if available and recharging is not an option. Note that a wireless receiver battery can recharge when not inserted into a device.

Figure 9A:
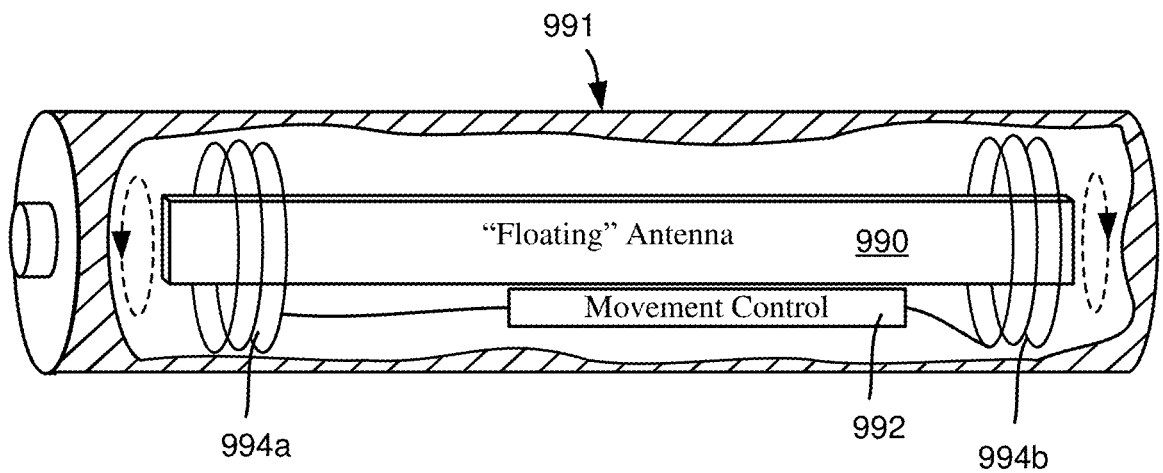
FIGS. 9A and 9B are generally side view and top-view illustrations of an automatically orienting antenna within a container, using memory metal heated with controlled current, in accordance with various example embodiments of the subject matter disclosed herein.
Figure 9B:
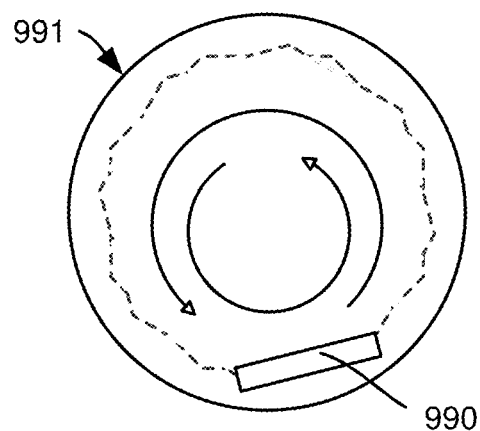

As described herein, improved antenna orientation facilitates improved wireless power signal reception. FIGS. 9A and 9B show a concept that orients a "floating" antenna 990 within a sealed enclosure such as a cylinder 991. Regardless of how the cylinder 991 is oriented when coupled to power a device, the antenna 990 can be moved around the inside of the cylinder 991 to a more optimal position, e.g., as determined by received signal strength and a movement control component 992.

To this end, memory metal 994*a* and 994*b* (comprising a shape-memory alloy such as Nitinol) electro-mechanically positions the battery within the cylinder. A relatively small electrical current from the movement control component 992 heats the memory metal 994*a* and 994*b*, such as to expand in one direction and contract in another, and thus reorient the antenna 990 relative to the cylinder. Although the current is relatively low for a small antenna in a battery-sized setting, it may be feasible to recapture some of the heat energy and use it to recharge the battery.

Figure 10:
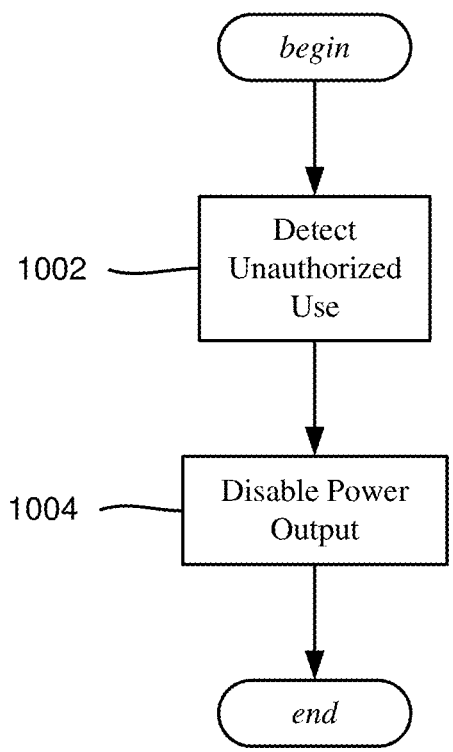
FIG. 10 illustrates a flow diagram showing example operations with respect to disabling power output from an unauthorized wireless power circuit, in accordance with various example embodiments of the subject matter disclosed herein.

Yet another aspect of the wireless power receiver is that memory and processing power of the circuitry can make an otherwise "dumb" device relatively smart. By way of example, an unauthorized device can be detected (operation 1002 of FIG. 10) and disabled (operation 1004 of FIG. 10). Detection can be as simple as receiving signals from other than an authorized charger, which can result in no power being output (immediate disabling), or preventing recharging until reauthorized (eventual disabling).

Another type of disabling can be based on parental control. A parent can authorize a child to use a device not more than X hours per day, not more than Y hours per week, not after 9 pm, and so on. The wireless receiver can log its usage, couple to a computer/smartphone to provide a report, predict remaining battery life (based on usage/recharges, the Li-Ion battery should be good for five more years).

As described herein, a wireless power unit can be mechanically locked into a device, so that a simple power pack or battery replacement is not possible. In addition to parental controls, remote disabling/enabling can prevent unauthorized usage or potentially dangerous misuse (e.g., disable a battery-powered power saw).

Disabling can be done remotely, such as if a device/power pack is missing and believed stolen. Note that if locked to a device, this can be a significant theft deterrent.

Re-enabling power output and/or recharging can be by remote (e.g., internet/Wi-Fi) communication, or can be automatic from a home transmitter, for example. In this way, a person who is not at home can unlock a device (e.g., a laptop) that he forgot to unlock and someone (who is authorized) needs to use.

As can be seen, the wireless power receiver technology described herein provides many benefits and advantages to any device that takes battery/battery pack. This can include but is not limited to phones, computers, laptops, gaming controllers, toys, television/entertainment remote controls, cameras such as mini-cams, video cameras, security cameras, digital cameras, microphones, wireless speakers, headphones and headsets, power tools, smart locks, baby monitors, and so forth.

Figure 11:
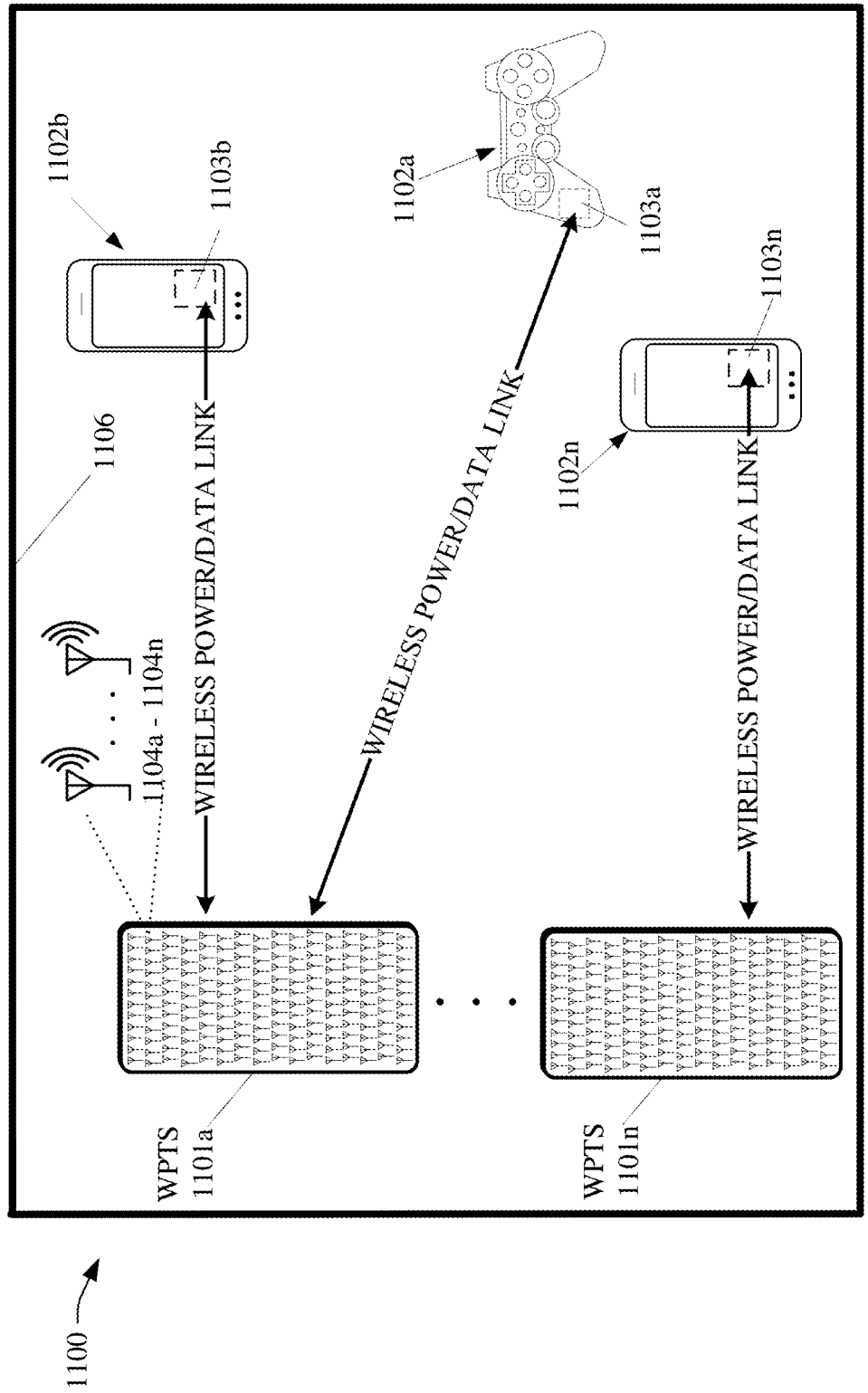
FIG. 11 depicts a block diagram of an example wireless power delivery environment illustrating wireless power delivery from one or more wireless power transmission systems to various wireless devices within the wireless power delivery environment, in accordance with various example embodiments of the subject matter disclosed herein.

FIG. 11 depicts a block diagram including an example wireless power delivery environment 1100 illustrating wireless power delivery from one or more wireless power transmission systems (WPTS) 1101a-n (also referred to as "wireless power delivery systems", "antenna array systems" and "wireless chargers") to various wireless devices 1102a-n within the wireless power delivery environment 1100, according to some embodiments. More specifically, FIG. 11 illustrates an example wireless power delivery environment 1100 in which wireless power and/or data can be delivered to available wireless devices 1102a-1102n having one or more wireless power receiver clients 1103a-1103n (also referred to herein as "clients" and "wireless power receivers"). The wireless power receiver clients are configured to receive and process wireless power from one or more wireless power transmission systems 1101a-1101n. Components of an example wireless power receiver client 1103 are shown and discussed in greater detail with reference to FIG. 14.

As shown in the example of FIG. 11, the wireless devices 1102a-1102n include mobile phone devices and a wireless game controller. However, the wireless devices 1102a-1102n can be any device or system that needs power and is capable of receiving wireless power via one or more integrated wireless power receiver clients 1103a-1103n. As discussed herein, the one or more integrated wireless power receiver clients receive and process power from one or more wireless power transmission systems 1101a-1101n and provide the power to the wireless devices 1102a-1102n (or internal batteries of the wireless devices) for operation thereof.

Each wireless power transmission system 1101 can include multiple antennas 1104a-n, e.g., an antenna array including hundreds or thousands of antennas, which are capable of delivering wireless power to wireless devices 1102a-1102n. In some embodiments, the antennas are adaptively-phased RF antennas. The wireless power transmission system 1101 is capable of determining the appropriate phases with which to deliver a coherent power transmission signal to the wireless power receiver clients 1103a-1103n. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 1101 can have an embedded Wi-Fi hub for data communications via one or more antennas or transceivers.

The wireless devices 1102 can include one or more wireless power receiver clients 1103. As illustrated in the example of FIG. 11, power delivery antennas 1104a-1104n are shown. The power delivery antennas 1104a are configured to provide delivery of wireless radio frequency power in the wireless power delivery environment. In some embodiments, one or more of the power delivery antennas 1104a-1104n can alternatively or additionally be configured for data communications in addition to or in lieu of wireless power delivery. The one or more data communication antennas are configured to send data communications to and receive data communications from the wireless power receiver clients 1103a-1103n and/or the wireless devices 1102a-1102n. In some embodiments, the data communication antennas can communicate via Bluetooth™, Wi-Fi_33™, ZigBee™, etc. Other data communication protocols are also possible.

Each wireless power receiver client 1103a-1103n includes one or more antennas (not shown) for receiving signals from the wireless power transmission systems 1101a-1101n. Likewise, each wireless power transmission system 1101a-1101n includes an antenna array having one or more antennas and/or sets of antennas capable of emitting continuous wave or discrete (pulse) signals at specific phases relative to each other. As discussed above, each of the wireless power transmission systems 1101a-1101n is capable of determining the appropriate phases for delivering the coherent signals to the wireless power receiver clients 1102a-1102n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 1101a-1101n can be connected to a power source such as, for example, a power outlet or source connecting the wireless power transmission systems to a standard or primary AC power supply in a building. Alternatively, or additionally, one or more of the wireless power transmission systems 1101a-1101n can be powered by a battery or via other mechanisms, e.g., solar cells, etc.

The wireless power receiver clients 1102a-1102n and/or the wireless power transmission systems 1101a-1101n are configured to operate in a multipath wireless power delivery environment. That is, the wireless power receiver clients 1102a-1102n and the wireless power transmission systems 1101a-1101n are configured to utilize reflective objects 1106 such as, for example, walls or other RF reflective obstructions within range to transmit beacon (or calibration) signals and/or receive wireless power and/or data within the wireless power delivery environment. The reflective objects 1106 can be utilized for multi-directional signal communication regardless of whether a blocking object is in the line of sight between the wireless power transmission system and the wireless power receiver clients 1103a-1103n.

As described herein, each wireless device 1102a-1102n can be any system and/or device, and/or any combination of devices/systems that can establish a connection with another device, a server and/or other systems within the example environment 1100. In some embodiments, the wireless devices 1102a-1102n include displays or other output functionalities to present data to a user and/or input functionalities to receive data from the user. By way of example, a wireless device 1102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 1102 can also be any wearable device such as watches, necklaces, rings or even devices embedded on or within the customer. Other examples of a wireless device 1102 include, but are not limited to, safety sensors (e.g., fire or carbon monoxide), electric toothbrushes, electronic door lock/handles, electric light switch controller, electric shavers, etc.

Although not illustrated in the example of FIG. 11, the wireless power transmission system 1101 and the wireless power receiver clients 1103a-1103n can each include a data communication module for communication via a data channel. Alternatively, or additionally, the wireless power receiver clients 1103a-1103n can direct the wireless devices 1102a-1102n to communicate with the wireless power transmission system via existing data communications modules. In some embodiments, the beacon signal, which is primarily referred to herein as a continuous waveform, can alternatively or additionally take the form of a modulated signal.

Figure 12:
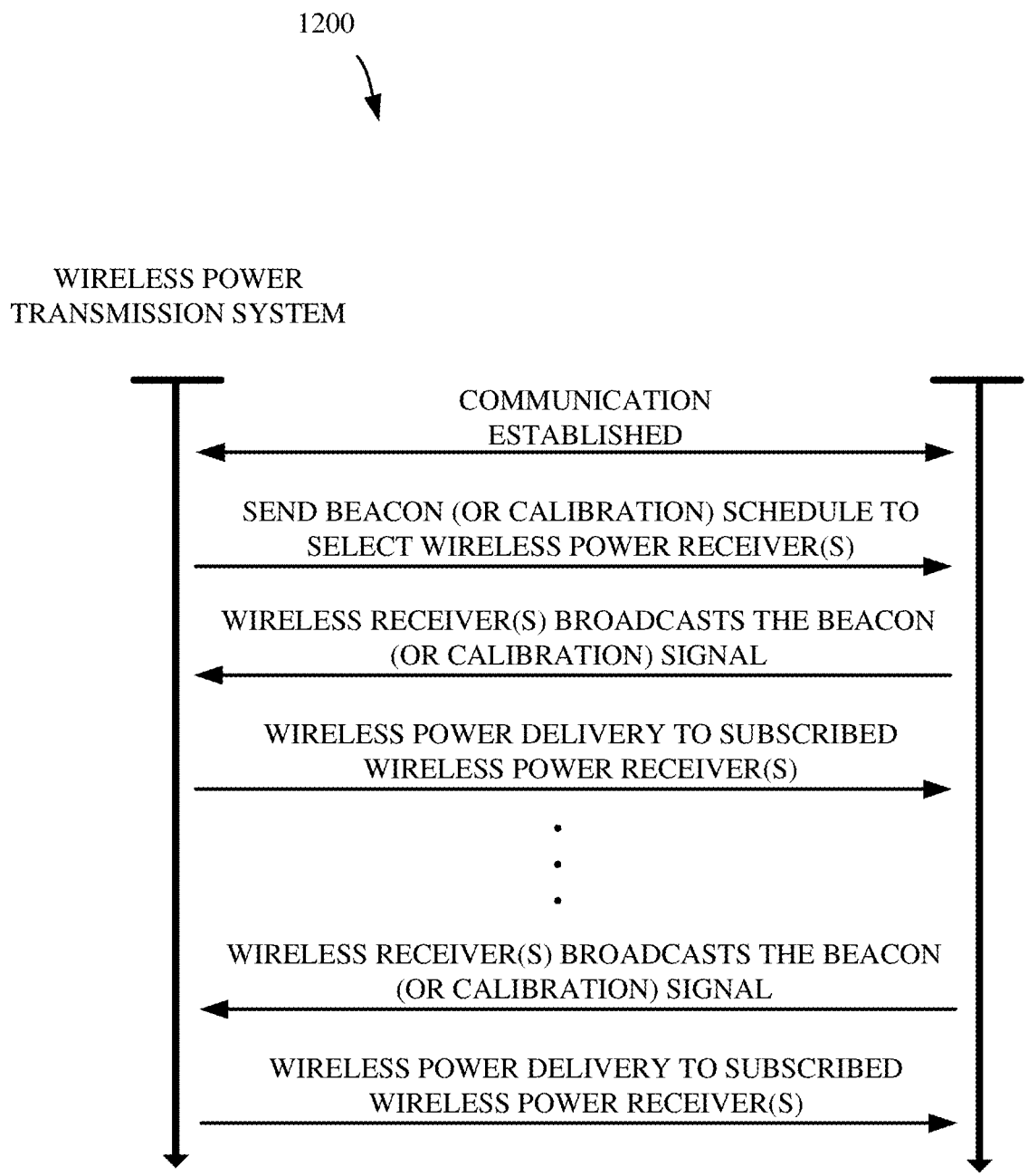
FIG. 12 depicts a sequence diagram illustrating example operations between a wireless power transmission system and a wireless power receiver client for commencing wireless power delivery, in accordance with various example embodiments of the subject matter disclosed herein.

FIG. 12 depicts a sequence diagram 1200 illustrating example operations between a wireless power delivery system (e.g., wireless power transmission system 1101 of FIG. 11) and a wireless power receiver client (e.g., FIG. 14) for establishing wireless power delivery in a multipath wireless power delivery, according to an embodiment. Initially, communication is established between the wireless power delivery system and the power receiver client. The initial communication can be, for example, a data communication link that is established via one or more antennas (e.g., 1104a-1104n) of the wireless power transmission system. As discussed, in some embodiments, one or more of the antennas can be data antennas, wireless power transmission antennas, or dual-purpose data/power antennas. Various information can be exchanged between the wireless power transmission system and the wireless power receiver client over this data communication channel. For example, wireless power signaling can be time sliced among various clients in a wireless power delivery environment. In such cases, the wireless power transmission system can send beacon schedule information, e.g., Beacon Beat Schedule (BBS) cycle, power cycle information, etc., so that the wireless power receiver client knows when to transmit (broadcast) its beacon signals and when to listen for power, etc.

Continuing with the example of FIG. 12, the wireless power transmission system selects one or more wireless power receiver clients for receiving power and sends the beacon schedule information to the selected wireless power receiver clients. The wireless power transmission system can also send power transmission scheduling information so that the wireless power receiver client knows when to expect (e.g., a window of time) wireless power from the wireless power transmission system. The wireless power receiver client then generates a beacon (or calibration) signal and broadcasts the beacon during an assigned beacon transmission window (or time slice) indicated by the beacon schedule information, e.g., BBS cycle. As discussed herein, the wireless power receiver client includes one or more antennas (or transceivers) that have a radiation and reception pattern in three-dimensional space proximate to the wireless device in which the wireless power receiver client is embedded.

The wireless power transmission system receives the beacon from the power receiver client and detects and/or otherwise measures the phase (or direction) from which the beacon signal is received at multiple antennas. The wireless power transmission system then delivers wireless power to the power receiver client from the multiple antennas based on the detected or measured phase (or direction) of the received beacon at each of the corresponding antennas. In some embodiments, the wireless power transmission system determines the complex conjugate of the measured phase of the beacon and uses the complex conjugate to determine a transmit phase that configures the antennas for delivering and/or otherwise directing wireless power to the wireless power receiver client via the same path over which the beacon signal was received from the wireless power receiver client.

In some embodiments, the wireless power transmission system includes many antennas. One or more of the many antennas may be used to deliver power to the power receiver client. The wireless power transmission system can detect and/or otherwise determine or measure phases at which the beacon signals are received at each antenna. The large number of antennas may result in different phases of the beacon signal being received at each antenna of the wireless power transmission system. As discussed above, the wireless power transmission system can determine the complex conjugate of the beacon signals received at each antenna. Using the complex conjugates, one or more antennas may emit a signal that takes into account the effects of the large number of antennas in the wireless power transmission system. In other words, the wireless power transmission system can emit a wireless power transmission signal from one or more antennas in such a way as to create an aggregate signal from the one or more of the antennas that approximately recreates the waveform of the beacon in the opposite direction. Said another way, the wireless power transmission system can deliver wireless RF power to the wireless power receiver clients via the same paths over which the beacon signal is received at the wireless power transmission system. These paths can utilize reflective objects 1106 within the environment. Additionally, the wireless power transmission signals can be simultaneously transmitted from the wireless power transmission system such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients within the power delivery environment according to, for example, the BBS, so that the wireless power transmission system can maintain knowledge and/or otherwise track the location of the power receiver clients in the wireless power delivery environment. The process of receiving beacon signals from a wireless power receiver client at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 13.

Figure 13:
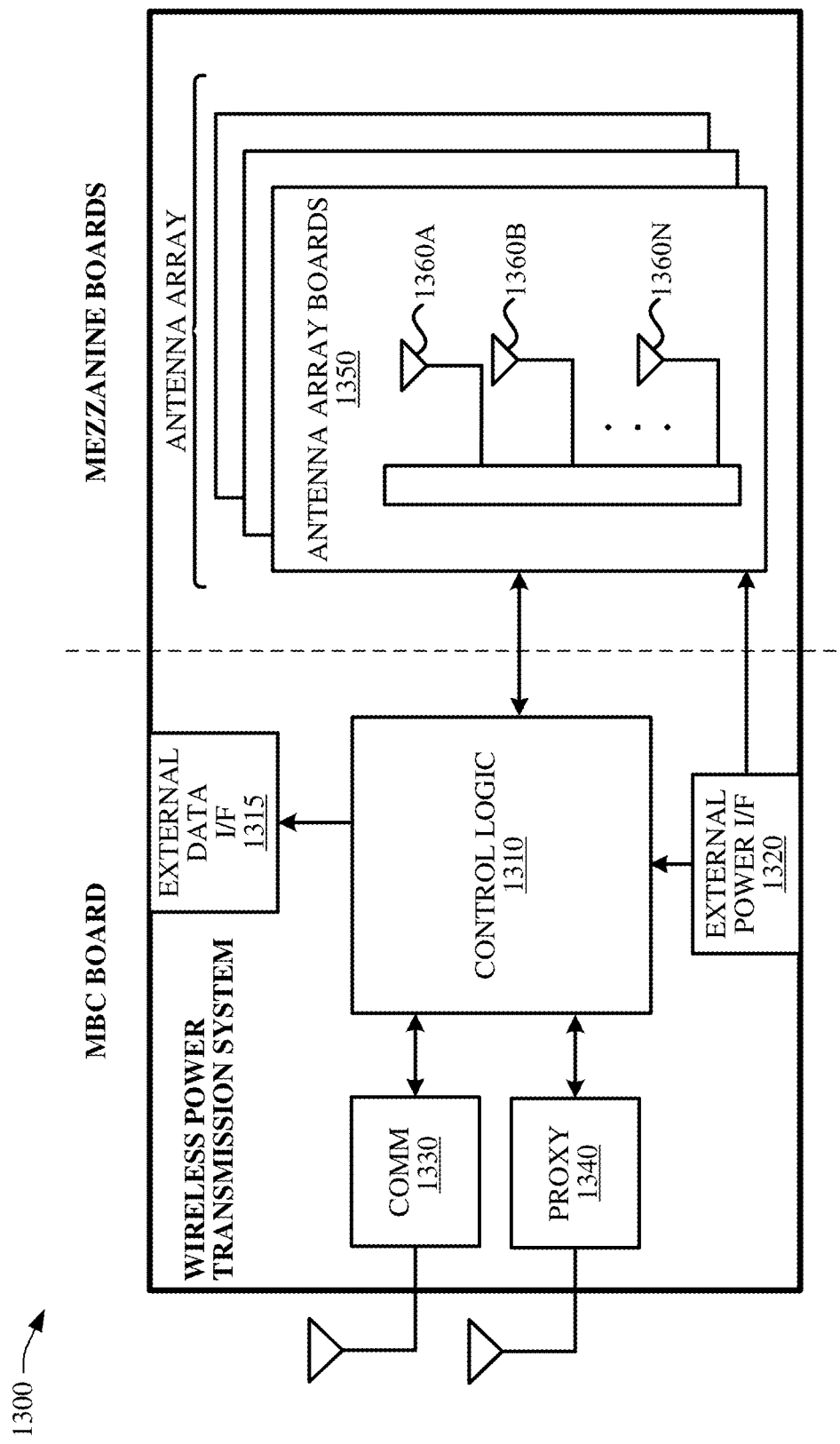
FIG. 13 depicts a block diagram illustrating example components of a wireless power transmission system, in accordance with various example embodiments of the subject matter disclosed herein.

FIG. 13 depicts a block diagram illustrating example components of a wireless power transmission system 1300, in accordance with an embodiment. As illustrated in the example of FIG. 13, the wireless power transmission system 1300 includes a master bus controller (MBC) board and multiple mezzanine boards that collectively comprise the antenna array. It should be appreciated that in other embodiment(s) (not shown), the wireless power transmission system 1300 can be communicatively coupled other such components, e.g., in addition to, or in lieu of, being communicatively coupled to the antenna array via the multiple mezzanine boards.

The MBC includes control logic 1310, an external data interface (UF) 1315, an external power interface (UF) 1320, a communication block 1330 and proxy 1340. The mezzanine boards (or antenna array boards 1350) each include multiple antennas 1360a-1360n. Some or all of the components can be omitted in some embodiments. Additional components are also possible. For example, in some embodiments only one of communication block 1330 or proxy 1340 may be included.

The control logic 1310 is configured to provide control and intelligence to the array components. The control logic 1310 may comprise one or more processors, FPGAs, memory units, etc., and direct and control the various data and power communications. The communication block 1330 can direct data communications on a data carrier frequency, such as the base signal clock for clock synchronization. The data communications can be Bluetooth™, WiFi™, ZigBee™, etc., including combinations or variations thereof. Likewise, the proxy 1340 can communicate with clients via data communications as discussed herein. The data communications can be, by way of example and not limitation, Bluetooth™, WiFi™, ZigBee™, etc. Other communication protocols are possible.

In some embodiments, the control logic 1310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system over a data connection. This IoT information can be provided to via an external data interface 1315 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoT devices. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 1320 is configured to receive external power and provide the power to various components. In some embodiments, the external power interface 1320 may be configured to receive a standard external 24 Volt power supply. In other embodiments, the external power interface 1320 can be, for example, 120/240 Volt alternating current (AC) mains to an embedded direct current (DC) power supply that sources the required 12/24/48 Volt DC to provide the power to various components. Alternatively, the external power interface could be a DC power supply that sources the required 12/24/48 Volts DC. Alternative configurations are also possible.

In operation, the MBC, which controls the wireless power transmission system, receives power from a power source and is activated. The MBC then activates proxy antenna elements on the wireless power transmission system and the proxy antenna elements enter a default "discovery" mode to identify available wireless power receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a BBS cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy AE can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 14:
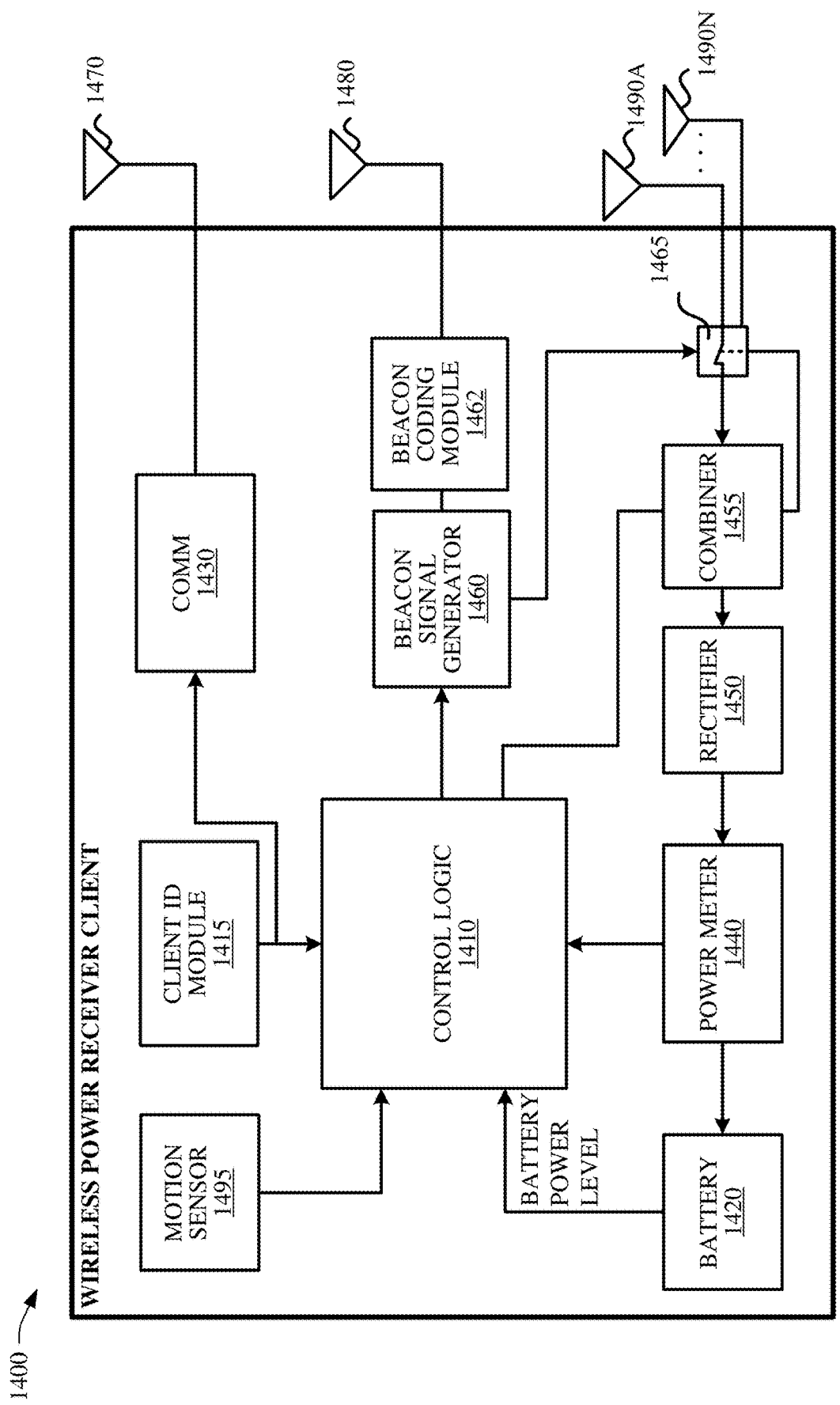
FIG. 14 depicts a block diagram illustrating example components of a wireless power receiver client, in accordance with various example embodiments of the subject matter disclosed herein.

FIG. 14 is a block diagram illustrating example components of a wireless power receiver client 1400, in accordance with some embodiments. As illustrated in the example of FIG. 14, the wireless power receiver client 1400 includes control logic 1410, battery 1420, communication block 1430 and associated antenna 1470, power meter 1440, rectifier 1450, a combiner 1455, beacon signal generator 1460, beacon coding unit 1462 and an associated antenna 1480, and switch 1465 connecting the rectifier 1450 or the beacon signal generator 1460 to one or more associated antennas 1490a-n. Some or all of the components can be omitted in some embodiments. For example, in some embodiments, the wireless power receiver client 1400 does not include its own antennas but instead utilizes and/or otherwise shares one or more antennas (e.g., Wi-Fi_33 antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 1455 receives and combines the received power transmission signals from the power transmitter in the event that the receiver 1400 has more than one antenna. The combiner can be any combiner or divider circuit that is configured to achieve isolation between the output ports while maintaining a matched condition. For example, the combiner 1455 can be a Wilkinson Power Divider circuit. The rectifier 1450 receives the combined power transmission signal from the combiner 1455, if present, which is fed through the power meter 1440 to the battery 1420 for charging. In other embodiments, each antenna's power path can have its own rectifier 1450 and the DC power out of the rectifiers is combined prior to feeding the power meter 1440. The power meter 1440 can measure the received power signal strength and provides the control logic 1410 with this measurement.

Battery 1420 can include protection circuitry and/or monitoring functions. Additionally, the battery 1420 can include one or more features, including, but not limited to, current limiting, temperature protection, over/under voltage alerts and protection, and coulomb monitoring.

The control logic 1410 receives and processes the battery power level from the battery 1420 itself. The control logic 1410 may also transmit/receive via the communication block 1430 a data signal on a data carrier frequency, such as the base signal clock for clock synchronization. The beacon signal generator 1460 generates the beacon signal, or calibration signal, transmits the beacon signal using either the antenna 1480 or 1490 after the beacon signal is encoded.

It may be noted that, although the battery 1420 is shown as charged by, and providing power to, the wireless power receiver client 1400, the receiver may also receive its power directly from the rectifier 1450. This may be in addition to the rectifier 1450 providing charging current to the battery 1420, or in lieu of providing charging. Also, it may be noted that the use of multiple antennas is one example of implementation and the structure may be reduced to one shared antenna.

In some embodiments, the control logic 1410 can communicate with and/or otherwise derive IoT information from the device in which the wireless power receiver client 1400 is embedded. Although not shown, in some embodiments, the wireless power receiver client 1400 can have one or more data connections (wired or wireless) with the device in which the wireless power receiver client 1400 is embedded over which IoT information can be obtained. Alternatively, or additionally, IoT information can be determined and/or inferred by the wireless power receiver client 1400, e.g., via one or more sensors. As discussed above, the IoT information can include, but is not limited to, information about the capabilities of the device in which the wireless power receiver client 1400 is embedded, usage information of the device in which the wireless power receiver client 1400 is embedded, power levels of the battery or batteries of the device in which the wireless power receiver client 1400 is embedded, and/or information obtained or inferred by the device in which the wireless power receiver client is embedded or the wireless power receiver client itself, e.g., via sensors, etc.

In some embodiments, a client identifier (ID) module 1415 stores a client ID that can uniquely identify the wireless power receiver client 1400 in a wireless power delivery environment. For example, the ID can be transmitted to one or more wireless power transmission systems when communication is established. In some embodiments, wireless power receiver clients may also be able to receive and identify other wireless power receiver clients in a wireless power delivery environment based on the client ID.

An optional motion sensor 1495 can detect motion and signal the control logic 1410 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 15A:
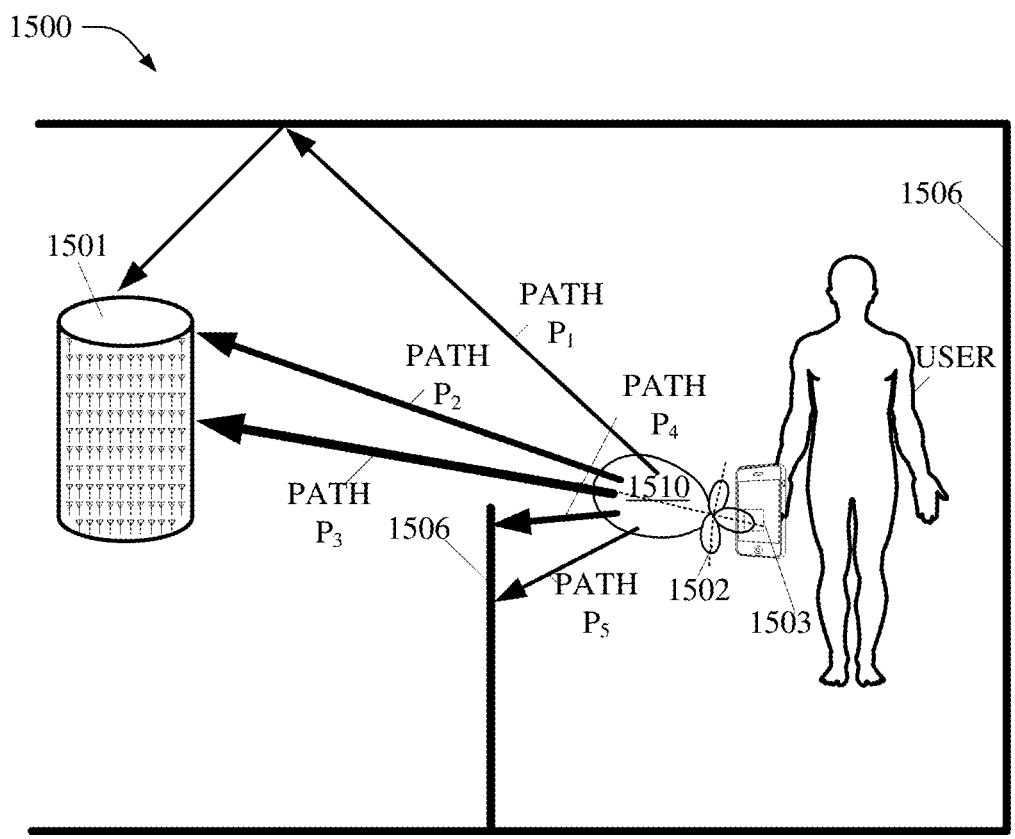
FIGS. 15A and 15B depict block diagrams illustrating example multipath wireless power delivery environments, in accordance with various example embodiments of the subject matter disclosed herein.
Figure 15B:
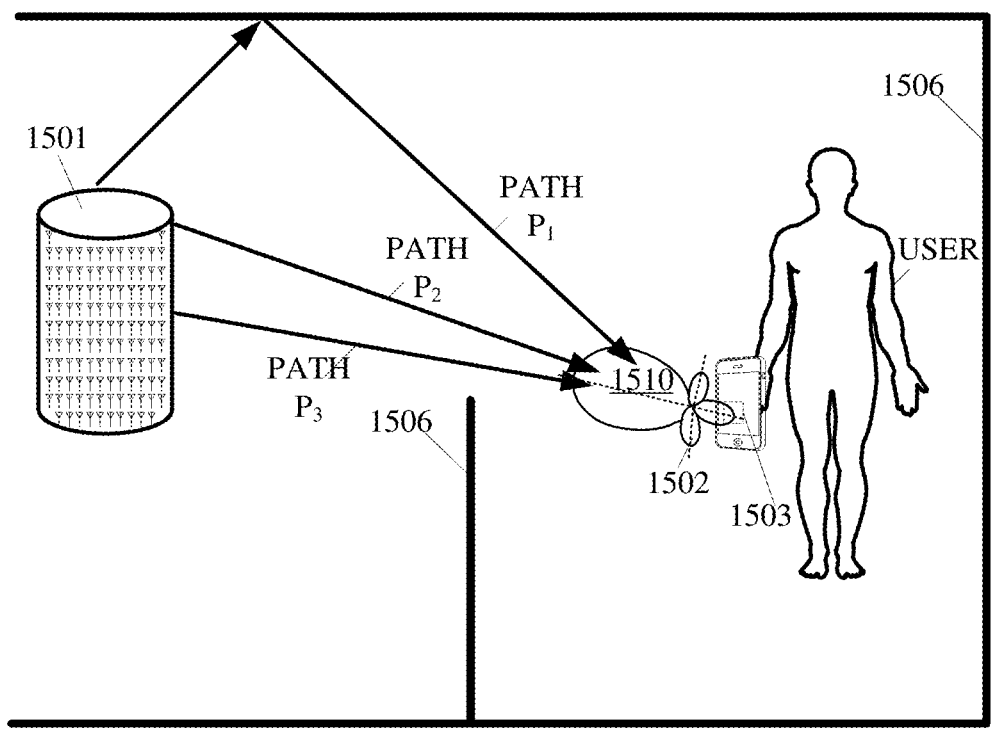

FIGS. 15A and 15B depict diagrams illustrating an example multipath wireless power delivery environment 1500, according to some embodiments. The multipath wireless power delivery environment 1500 includes a user operating a wireless device (e.g., 1502, etc.) including one or more wireless power receiver clients (e.g., 1503). The wireless device 1502 can be wireless device as described herein, and the one or more wireless power receiver clients 1503 can be a wireless power receiver client 1400, although alternative configurations are possible. Likewise, wireless power transmission system 1501 can be any of those depicted and/or described herein, for example, although alternative configurations are possible. The multipath wireless power delivery environment 1500 includes reflective objects 1506 and various absorptive objects, e.g., users, or humans, furniture, etc.

Wireless device 1502 includes one or more antennas (or transceivers) that have a radiation and reception pattern 1510 in three-dimensional space proximate to the wireless device 1502. The one or more antennas (or transceivers) can be wholly or partially included as part of the wireless device 1502 and/or the wireless power receiver client (not shown). For example, in some embodiments one or more antennas, e.g., Wi-Fi_33, Bluetooth, etc. of the wireless device 1502 can be utilized and/or otherwise shared for wireless power reception. As shown in the examples of FIGS. 15A and 15B, the radiation and reception pattern 1510 comprises a lobe pattern with a primary lobe and multiple side lobes. Other patterns are also possible.

The wireless device 1502 transmits a beacon (or calibration) signal over multiple paths to the wireless power transmission system 1501. As discussed herein, the wireless device 1502 transmits the beacon in the direction of the radiation and reception pattern 1510 such that the strength of the received beacon signal by the wireless power transmission system, e.g., received signal strength indication (RSSI), depends on the radiation and reception pattern 1510. For example, beacon signals are not transmitted where there are nulls in the radiation and reception pattern 1510 and beacon signals are the strongest at the peaks in the radiation and reception pattern 1510, e.g., peak of the primary lobe. As shown in the example of FIG. 15A, the wireless device 1502 transmits beacon signals over five paths P1-P5. Paths P4 and P5 are blocked by reflective and/or absorptive object 1506. The wireless power transmission system 1501 receives beacon signals of increasing strengths via paths P1-P3. The bolder lines indicate stronger signals. In some embodiments, the beacon signals are directionally transmitted in this manner, for example, to avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 15A and 15B, the radiation and reception pattern 1510 is a three-dimensional lobe shape. However, the radiation and reception pattern 1510 can be any number of shapes depending on the type or types, e.g., horn antennas, simple vertical antenna, etc. used in the antenna design. For example, the radiation and reception pattern 1510 can comprise various directive patterns. Any number of different antenna radiation and reception patterns are possible for each of multiple client devices in a wireless power delivery environment.

Referring again to FIG. 15A, the wireless power transmission system 1501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 1501, the power transmission system 1501 processes the beacon (or calibration) signal to determine one or more receive characteristics of the beacon signal at each of the multiple antennas. For example, among other operations, the wireless power transmission system 1501 can measure the phases at which the beacon signal is received at each of the multiple antennas or transceivers.

The wireless power transmission system 1501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 1501 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 15B illustrates the wireless power transmission system 1501 transmitting wireless power via paths P1-P3 to the wireless device 1502. Advantageously, as discussed herein, the wireless power signal matches the client radiation and reception pattern 1510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receive power, e.g., nulls and blockages. In some embodiments, the wireless power transmission system 1501 measures the RSSI of the received beacon signal and if the beacon is less than a threshold value, the wireless power transmission system will not send wireless power over that path.

The three paths shown in the examples of FIGS. 15A and 15B are illustrated for simplicity, it is appreciated that any number of paths can be utilized for transmitting power to the wireless device 1502 depending on, among other factors, reflective and absorptive objects in the wireless power delivery environment. Although the example of FIG. 15A illustrates transmitting a beacon (or calibration) signal in the direction of the radiation and reception pattern 1510, it is appreciated that, in some embodiments, beacon signals can alternatively or additionally be omni-directionally transmitted.

Figure 16:
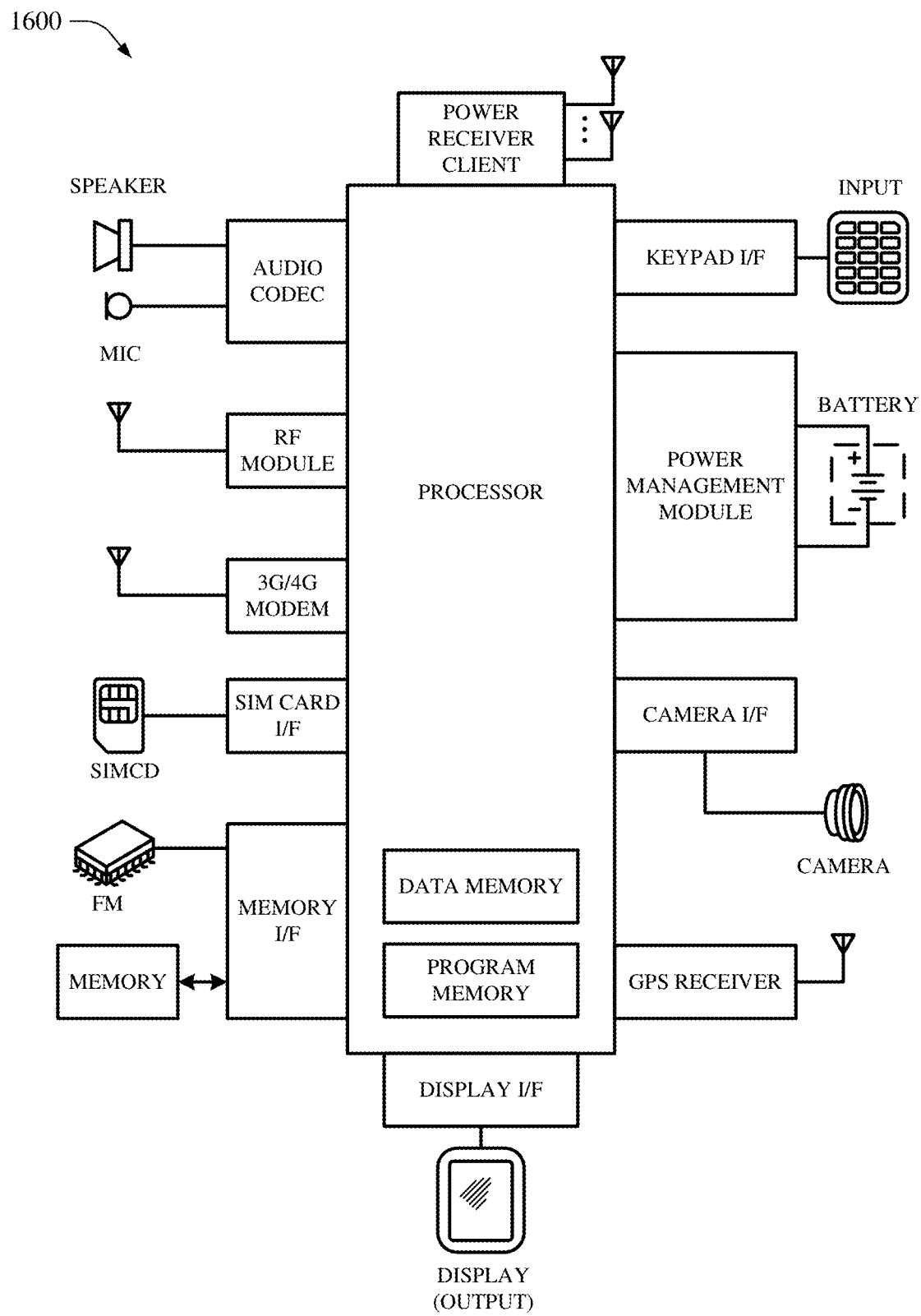
FIG. 16 depicts a block diagram illustrating example components of a representative mobile device or tablet computer with a wireless power receiver or client in the form of a mobile (or smart) phone or tablet computer device, in accordance with various example embodiments of the subject matter disclosed herein.

FIG. 16 depicts a block diagram illustrating example components of a representative mobile device (e.g., 1502) or tablet computer 1600 with a wireless power receiver or client in the form of a mobile (or smart) phone or tablet computer device, according to an embodiment. Various interfaces and modules are shown with reference to FIG. 16; however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RF identification (RFID) transceivers, along with antennas, can populate a PCB.

The wireless power receiver client can be a power receiver client of FIG. 16, although alternative configurations are possible. Additionally, the wireless power receiver client can include one or more RF antennas for reception of power and/or data signals from a charger, e.g., WPTS 1101a-n.

Figure 17:
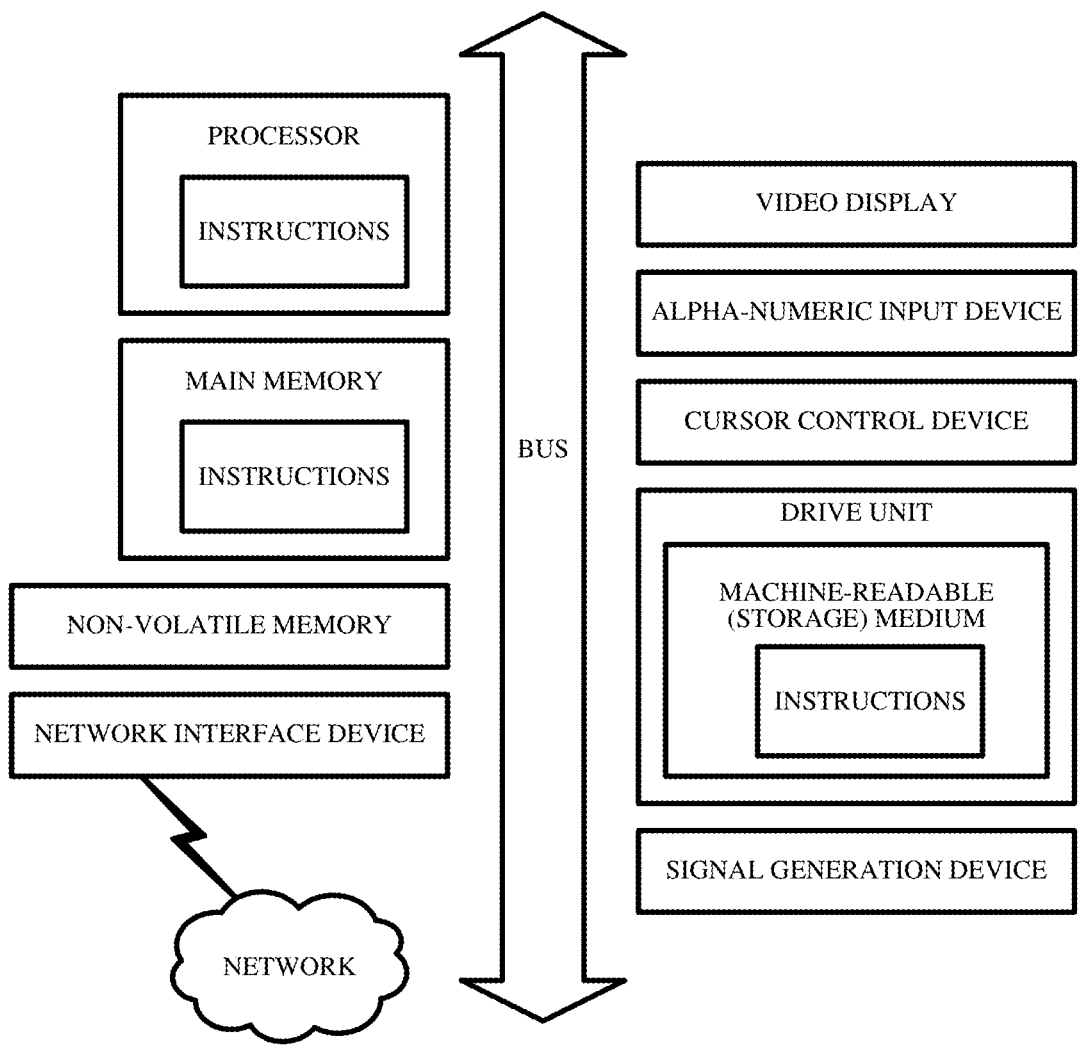
FIG. 17 depicts a diagrammatic representation of a machine, in an example form, of a computer system within which a set of instructions, for causing the machine to perform any one or more of the methodologies discussed herein, may be executed, in accordance with various example embodiments of the subject matter disclosed herein.

FIG. 17 depicts a diagrammatic representation of a machine, in the example form, of a computer system within which a set of instructions, for causing the machine to perform any one or more of the methodologies discussed herein, may be executed.

In the example of FIG. 17, the computer system includes a processor, memory, non-volatile memory, and an interface device. Various common components (e.g., cache memory) are omitted for illustrative simplicity. The computer system 1700 is intended to illustrate a hardware device on which any of the components depicted, e.g., in FIG. 1, FIG. 16, etc. (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a compact disk ROM (CD-ROM), electrically programmable ROM (EPROM), or electrically erasable ROM (EEPROM), a magnetic or optical card, or another form of storage for large amounts of data. Some of this data is often written, by a direct memory access process, into memory during execution of software in the computer 1700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, an integrated services digital network (ISDN) modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 17 reside in the interface.

In operation, the computer system 1700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

As it employed in the subject specification, the term "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processing component can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. A processing component can exploit nano-scale architectures such as, but not limited to, molecular and quantum-dot based transistors, switches and gates, in order to optimize space usage or enhance performance of components described herein. Further, a processing component can also be implemented as a combination of computing processing units.

In the subject specification, term "memory component" and substantially any other information storage component relevant to operation and functionality of a component and/or process described herein, refer to entities embodied in a "memory," or components comprising the memory. It will be appreciated that a memory component described herein can be either volatile memory or nonvolatile memory, or can include both volatile and nonvolatile memory.

By way of illustration, and not limitation, nonvolatile memory, for example, can be included in ROM, programmable ROM (PROM), EPROM, EPROM, or flash memory. Volatile memory can include RAM, which acts as external cache memory. By way of illustration and not limitation, RAM is available in many forms such as SRAM, DRAM, synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "connected," "coupled," or any variant thereof, means any connection or coupling, either direct or indirect, between two or more elements; the coupling of connection between the elements can be physical, logical, or a combination thereof. Where context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a processor; and
    a memory that stores executable instructions that, when executed by the processor, facilitate performance of operations by the processor, comprising:
        based on received signal strengths of respective signals that have been received via a movable antenna that is included in a container of the system, determining that an orientation of the movable antenna within the container satisfies a defined condition with respect to reception, via a wireless power receiver that is included in the container, of respective wireless power signals from a wireless power signal transmitter; and
        in response to reorienting the movable antenna into the orientation, receiving, via the movable antenna, the respective wireless power signals from the wireless power signal transmitter to facilitate provision of power to a device of the system based on the respective wireless power signals.

2. The system of claim 1, wherein the determining of the orientation of the movable antenna comprises:
    determining that a received signal strength of the received signal strengths corresponding to the orientation of the movable antenna is greater than other received signal strengths of the received signal strengths that are different from the received signal strength and that correspond to other orientations of the movable antenna that are different from the orientation.

3. The system of claim 1, wherein the determining of the orientation of the movable antenna comprises:
    determining the orientation using at least one accelerometer.

4. The system of claim 1, wherein the respective signals have been received from the wireless power signal transmitter.

5. The system of claim 1, wherein the container comprises a sealed enclosure.

6. The system of claim 5, wherein the sealed enclosure is a cylinder.

7. The system of claim 1, wherein the orientation is a first orientation, and wherein the reorienting of the movable antenna into the first orientation comprises:
    moving the movable antenna into the first orientation, wherein the first orientation is different from a second orientation of the container.

8. The system of claim 1, wherein the container is initially randomly-oriented with respect to the wireless power receiver.

9. The system of claim 1, wherein the device is a battery.

10. The system of claim 9, wherein the antenna is electromechanically positioned within the battery using a shape-memory alloy.

11. The system of claim 10, wherein the shape memory alloy is Nitinol.

12. The system of claim 10, wherein the reorienting of the movable antenna comprises:

applying an electrical current to the shape-memory alloy to facilitate heating of the shape-memory alloy.

13. The system of claim 12, wherein the operations further comprise:
recapturing at least a portion of heat energy corresponding to the heating of the shape-memory alloy; and
based on the portion of heat energy, recharging the battery.

14. A method, comprising:
receiving, by a system via an antenna of the system, reference signals, wherein the antenna is movable within a container of the system;
determining, by the system, respective signal strengths of the reference signals;
based on the respective signal strengths of the reference signals, selecting, by the system, an orientation, within the container, of the antenna at which the antenna is expected to receive a wireless power signal based on a defined power reception level that is different from other power reception levels corresponding to other orientations of the antenna other than the orientation, wherein the other orientations are different from the orientation, the selecting resulting in a selected orientation; and
in response to orienting the antenna into the selected orientation, receiving, by the system via the antenna, the wireless power signal.

15. The method of claim 14, wherein the receiving of the wireless power signal comprises:
receiving, via a wireless power receiver that is included in the container, the wireless power signal.

16. The method of claim 14, further comprising:
providing, by the system, power to a device of the system based on the wireless power signal.

17. The method of claim 14, wherein the orienting of the antenna comprises:
applying an electrical current to a shape-memory alloy of the container to facilitate reorientation of the antenna relative to a fixed orientation of the container.

18. The method of claim 17, wherein the reorientation of the antenna comprises:
heating the shape-memory alloy to facilitate expansion of a first portion of the shape-memory alloy and contraction of a second portion of the shape-memory alloy.

19. A non-transitory machine-readable medium, comprising executable instructions that, when executed by a system comprising a processor, facilitate performance of operations, comprising:
in response to receiving, via an antenna that has been included in a container of the system, reference signals, determining, based on the reference signals, an orientation of the antenna within the container to facilitate reception, via the antenna, of wireless power signals according to a defined power reception level of a wireless power receiver that is this included in the container; and
in response to orienting the antenna into the orientation within the container to facilitate the reception of the wireless power signals according to the defined power reception level, providing power to a device of the system based on the wireless power signals.

20. The non-transitory machine-readable medium of claim 19, wherein the container comprises a cylinder, and wherein the orienting of the antenna comprises:
orienting the antenna within the cylinder via a memory metal coupled to the antenna.

\* \* \* \* \*